May 28, 1935.  B. B. BAILES  2,003,229

MUZZLE

Filed Jan. 15, 1934

Bob B. Bailes, INVENTOR

BY Victor J. Evans & Co. ATTORNEY

WITNESS:

Patented May 28, 1935

2,003,229

UNITED STATES PATENT OFFICE 2,003,229

MUZZLE

Bob B. Bailes, Stigler, Okla.

Application January 15, 1934, Serial No. 706,784

1 Claim. (Cl. 119—130)

The invention relates to a muzzle and more particularly to a calf weaning device.

The primary object of the invention is the provision of a muzzle or device of this character, wherein the same can be conveniently applied to the nose of a calf or other animal, and when worn will not interfere with drinking or eating by the animal, but will retard such animal from sucking, for the purpose of weaning the same. The wearing of the muzzle or device by the animal will not injure or cause discomfort to the same.

Another object of the invention is the provision of a muzzle or device of this character which is simple in construction, thoroughly reliable and efficient in its purpose, readily and easily applied to and removed from an animal, novel in construction, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing.

Similar reference characters indicate corresponding parts throughout the several views in the drawing.

Figures 1, 2, 3, 4:
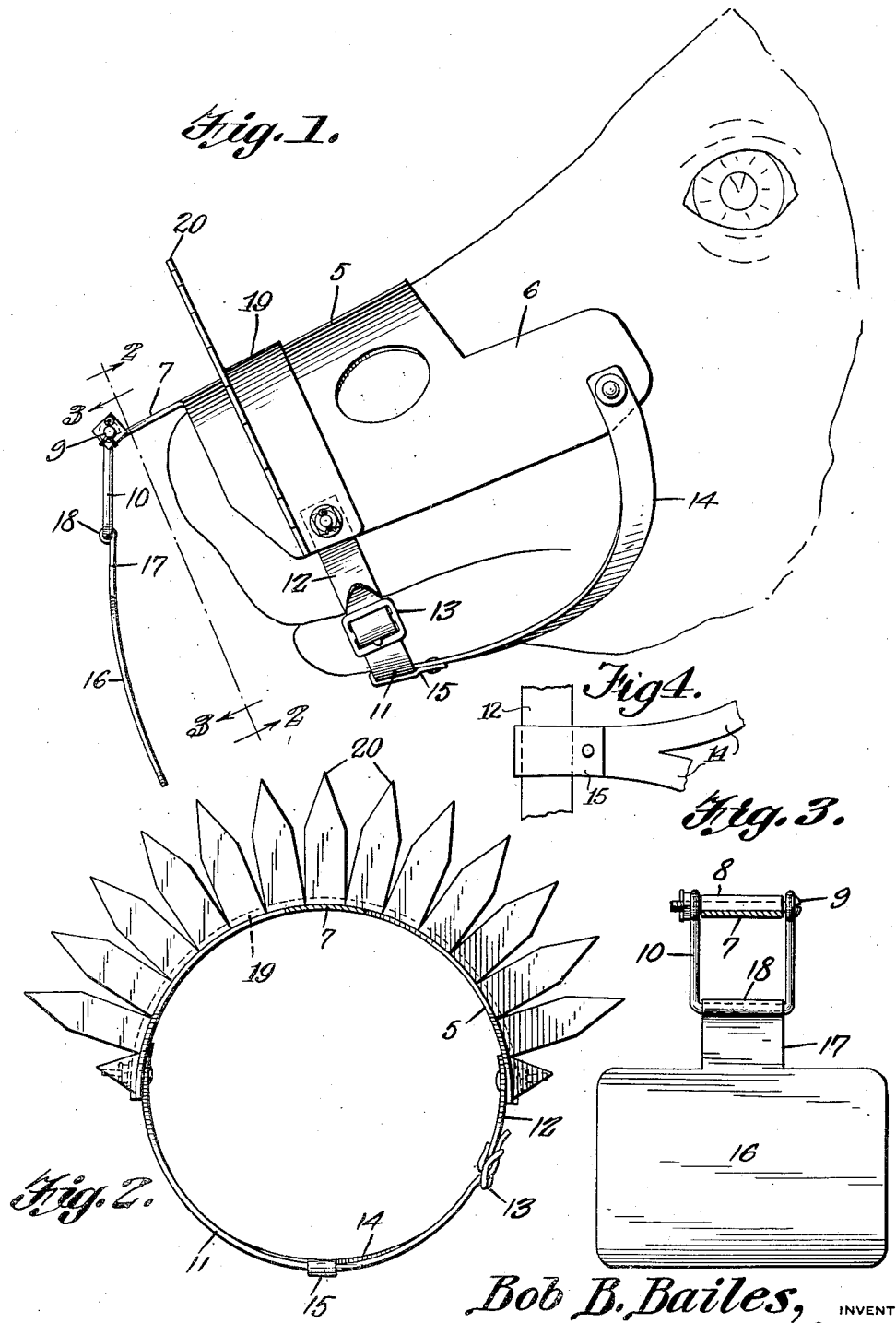
Figure 1 is a perspective view showing the application of the muzzle or device, constructed in accordance with the invention, to the head of a calf.
Figure 2 is a sectional view on the line 2—2 of Figure 1, looking in the direction of the arrows.
Figure 3 is a sectional view on the line 3—3 of Figure 1, looking in the direction of the arrows.
Figure 4 is a fragmentary bottom view of the hitch of the device.

Referring to the drawing in detail, the muzzle or device comprises a nose bridge including the body 5 having at each side thereof the rearwardly extending ear 6, while at the front of the body 5, intermediate thereof, is a projecting portion 7 formed at its outer free end with a pintle sleeve 8 carrying the pintle 9 for swingingly connecting the loop 10 to said extension for a purpose presently described.

Carried at the fore portion of the body 5 and suitably attached to opposite sides thereof are the adjustable jaw straps 11 and 12, respectively, these being adjustably joined with each other by a buckle 13 carried by the strap 12 for the fastening of such strap about the lower jaw of the animal when the nose bridge is placed upon the latter, as shown in Figure 1 of the drawing.

Loosely connected with each ear 6 is the branch 14 of a hitch 15, looped with the strap 11 beneath the lower jaw of the animal, which prevents the straps 11 and 12 working outwardly from beneath the lower jaw of said animal.

Swingingly connected with the loop 10 is a curved plate 16 having the central upper tab 17 provided with the pintle sleeve 18 loosely receiving the loop 10 and this plate 16 is suspended directly in front of the mouth of the animal and functions to prevent such animal from sucking.

Carried by the nose bridge 5 of the muzzle or device is the spur saddle 19 provided with the upwardly directed pricking spurs 20 so that the wearer of the muzzle or device, when attempting sucking, will inflict injury to another animal approached by the wearer, to frustrate any attempt of sucking, so that the wearer will be weaned of this habit, and the muzzle or device while being worn will not interfere with the free movement of the head of the animal nor prevent such animal from drinking, grazing or eating.

What is claimed is:

A device of the kind described comprising an arched nose bridge formed from a single sheet of material and having a medial forwardly projecting portion provided with a pintle sleeve at its outer free end, ears formed on the nose bridge and extended rearwardly, an adjustable lower jaw strap carried by the nose bridge, a hitch on said jaw strap and having branches fixed to the ears, a substantially U-shaped loop, a pintle swingingly connecting the loop with the pintle sleeve, a curved plate having a central tab swingingly supported by said loop to be suspended directly in front of a mouth of an animal, and a row of radially upstanding pricking spurs supported by said nose bridge.

BOB B. BAILES.